United States Patent [19]

Jackle

[11] 4,182,825
[45] Jan. 8, 1980

[54] POLYETHER BASED URETHANES WITH SUPERIOR DYNAMIC PROPERTIES

[75] Inventor: William A. Jackle, Newtown, Pa.

[73] Assignee: Thiokol Corporation, Newtown, Pa.

[21] Appl. No.: 950,336

[22] Filed: Oct. 11, 1978

[51] Int. Cl.$^2$ ............................................. C08G 18/10
[52] U.S. Cl. ....................................... 528/44; 528/61; 528/68
[58] Field of Search ..................... 528/61, 68, 44, 906, 528/903; 252/182

[56] References Cited

U.S. PATENT DOCUMENTS 3,412,071  11/1968  Sundholm .............................. 528/63

OTHER PUBLICATIONS

J. Chromatography, vol. 123, 1976, pp. 468–473, McFadyen.

Primary Examiner—Maurice J. Welsh
Attorney, Agent, or Firm—Stanley A. Marcus; Royal E. Bright

[57] ABSTRACT

Hydroxy terminated polyethers are capped with toluene diisocyanate, and the amount of unreacted toluene diisocyanate substantially reduced. When cured with 4,4'-methylene-bis-(2-chloroaniline), the cured products have superior dynamic properties to the corresponding toluene diisocyanate capped polyethers with usual unreacted toluene diisocyanate content. The cured products are useful in fabricating industrial tires.

8 Claims, No Drawings

POLYETHER BASED URETHANES WITH SUPERIOR DYNAMIC PROPERTIES

BACKGROUND OF THE INVENTION

This invention relates to the art of polyurethane chemistry particularly polyether polyols, toluene diisocyanate, 4,4'-methylene-bis-(2-chloroaniline) based polyurethanes, processes for their preparation and use and cured products formed therefrom.

Industrial tires based on toluene diisocyanate (TDI) endcapped polyether polyols cured with 4,4'-methylene-bis-(2-chloroaniline) (MOCA) are known and in commercial use. Under heavy loads and long use, the internal structure of these tires degrades, a problem commonly attributed to internal heat buildup. It has been found surprisingly that comparable systems wherein the quantity of unreacted TDI from the endcapping reaction has been substantially reduced to below 0.45% free TDI prior to MOCA cure show longer times to internal breakdown under dynamic stress.

Applicant knows of no art material to the patentability of this invention.

SUMMARY OF THE INVENTION

The invention provides a curable composition comprising:

(a) a polyether polyol endcapped with toluene diisocyanate content of less than 0.45%; and (b) 4,4'-methylene-bis-(2-chloroaniline).

The tangible embodiments of this composition aspect of the invention possess the inherent applied use characteristic of being curable to solid rubbery objects with extended dynamic stress failure times, thus evidencing their usefulness in the fabrication of solid industrial tires.

The invention also provides a process for the preparation of a cast object which comprises:

(a) treating of polyether polyol with an excess of a stoichiometric amount of toluene diisocyanate to prepare a toluene diisocyanate endcapped polyurethane prepolymer having an unreacted excess of toluene diisocyanate admixed therewith;

(b) removing the excess unreacted toluene diisocyanate from the mixture of step (a) above to produce a toluene diisocyanate endcapped polyether polyol substantially free of toluene diisocyanate;

(c) mixing the product of step (b) with a curing amount of 4,4'-methylene-bis-(2-chloroaniline);

(d) placing the mixture of step (c) in a mold of the desired shape; and (e) subjecting the mold containing the mixture of step (c) prepared in step (d) to a curing temperature.

The invention also provides a cured rubbery object comprising the reaction products of a toluene diisocyanate endcapped polyether polyol having a toluene diisocyanate content of less than 0.45% and 4,4'-methylene-bis-(2-chloroaniline).

DESCRIPTION OF THE PREFERRED EMBODIMENT

The manner of making and using the compositions of the invention will now be described with reference to a particular embodiment thereof, namely a curable composition based on a polyol polyether blend of 80% 1,000 molecular weight poly-(tetramethylene glycol) and 20% poly(oxypropylene) glycol of 1,000 molecular weight endcapped with HYLENE TM, an 80/20 blend of 2,4- and 2,6- toluene diisocyanate supplied by E. I. Du Pont de Nemours & Co. to a 6.00% NCO content which is then reduced in unreacted IDI to a total NCO content of 4.82% and unreacted isocyanate of about 0.22% (I) and 4,4'-methylene-bis-(2-chloroaniline).

To prepare I, poly(tetramethylene) glycol of 1,000 molecular weight and poly(oxypropylene glycol) of 1,000 molecular weight are blended in conventional fashion and treated with toluene diisocyanate at 1.97 NCO/OH ratio in conventional fashion and at the close of the reaction priod the total NCO and unreacted NCO content determined by conventional techniques. The unreacted TDI may then be removed by conventional techniques to obtain I. Fractional distillation in a wiped film evaporator is a convenient method. I may then be blended at elevated temperature, conveniently about 100° C., with MOCA in proportions known in the art, to obtain a 90 Shore A casting resin, a quantity of MOCA 90% of the amount required to theoretically combine with all the NCO content is a convenient amount. After addition of the MOCA and mixing in conventional fashion, the mixture so formed may be introduced into molds of the desired shape and subjected to elevated curing temperatures, preferably above room temperature, conveniently about 100° C. until the desired degree of hardness on cooling is attained.

One skilled in the art will recognize that various single polyether polyols or blends thereof may be employed as starting materials to prepare compositions of the invention comparable to I and that all starting materials are commercially available or preparable by well known techniques. The selection of a particular polyol or blend of polyols to obtain a particular range of properties or a particular cost range will be well within the level of skill of the art. Similarly, the tailoring of the ratio of isocyanate endcapping and of the proportions of MOCA curing agent will also be within the skill of the art. For example, as above, for a 90 Shore A hardness resin, the polyether polyols will have about 6.00% NCO content after TDI endcapping. Cure will be with MOCA at 90% stoichiometry after removal of unreacted TDI. Similarly, the cure time and temperature may also be varied by those skilled in the art to allow longer or shorter processing times and fine tuning of ultimate properties. When desired post cure heat conditioning may also be employed at the option of the skilled artisan.

The following examples further illustrate the best mode contemplated by the inventor for the practice of his invention.

EXAMPLE 1

PREPARATION OF 90 Shore A Hardness Casting Resin

A poly(tetramethylene) glycol of about 1,000 molecular weight and a poly(oxypropylene) glycol of about 1,000 molecular weight (the mixture then having equivalent weight of 500) is chain extended to about 6.00% NCO content at an NCO/OH ratio of about 1.9. To HYLENE TM (3.6 equivalents) is added a mixture of poly(tetramethylene) glycol (1.488 equivalents) and poly(oxypropylene) glycol (0.372 equivalents) is added slowly such that the temperature is kept below 55° C. After addition is complete, the reaction is heated under an inert atmosphere at 80° C. for two hours. Analysis for NCO Theoretical: 6.00%
Found: 6.20%

The reaction product is then passed through a wiped film molecular still at a jacket temperature of 150° C. at a pressure of 0.5–0.8 mm Hg. to obtain a low unreacted TDI prepolymer. S.G. 1.074 (25° C.).
Analysis for NCO
Found 4.96%
Unreacted TDI (by gas phase chromatography)- 0.22%

EXAMPLE 2

Preparation of 80 Shore A Hardness Casting Resin

A polyoxy (tetramethylene) glycol (2,000 molecular weight)- poly(oxypropylene) glycol (2,000 molecular weight) 80%/20% blend is endcapped with TDI to 4.45% NCO at an NCO/OH ratio of 2.16.

To HYLENE TM (2.16 equivalents) is added a blend of 2,000 molecular weight poly(tetramethylene) glycol (0.8 equivalents) and 2,000 molecular weight poly(oxypropylene) glycol (0.2 equivalents). The rate of addition is such that the reaction temperature is below 55° C. After addition is complete, the reaction mixture is heated at 80° C. under an inert atmosphere for 2 hours.
Analysis for NCO
Theoretical: 4.4%
Found: 4.44%
Unreacted TDI: 1.96%

The product is then passed through a wiped film molecular still at a jacket temperature of 150°–160° C. and a pressure of 0.2 mm Hg. to give a prepolymer.
Analysis for NCO
Found: 3.20%
Unreacted TDI: 0.05%

EXAMPLE 3

Stress Strain Properties of Cured Sheets

The prepolymer is conditioned in a metal can for 30 minutes at 100° C. A desired curing amount of MOCA is melted in an aluminum weighing dish. The materials are mixed thoroughly and poured into a heated (100° C.) mold and press cured 30 minutes at 100° C. After demolding, the sheets are post cured 16 hours at 100° C.

Physical properties are determined by the following methods:

| Property | ASTM Test Number |
| --- | --- |
| Stress-Strain | D-412 |
| Shore Hardness | D-2240 |
| Tear - Die C | D-624 |
| Compression Set | D-395 Method B |
| Bashore Rebound | D-2632 |
| Compression Deflection | D-575 |

When tested in this fashion, 3 samples of 80 Shore A hardness resins (Example 2) with the actual NCO and free TDI (FTDI) percentages shown when cured with MOCA at 90% stoichiometry gave the following properties:

| | | | |
| --- | --- | --- | --- |
| % NCO | 3.20 | 3.13 | 3.17 |
| % FTDI | 0.11 | 0.08 | 0.06 |
| Tensile, psi | 3225 | 3720 | 4450 |
| Elongation, % | 610 | 630 | 610 |
| Shore A | 83 | 84 | 78 |
| 100% Mod. | 610 | 625 | 500 |
| 200% Mod. | 800 | 800 | 675 |
| 300% Mod. | 1000 | 1025 | 900 |
| 400% Mod. | 1325 | 1380 | 1325 |
| 500% Mod. | 1900 | 1950 | 2100 |
| Tear - Die C | 358 | 361 | 313 |
| Bashore Rebound | 53 | 55 | 54 |
| Compression Set | 31 | 28.5 | 33 |
| (22 hrs. 158° F.) | — | — | — |
| Comp. Deflection | — | — | — |
| 5% | 158 | 175 | 128 |
| 10% | 318 | 353 | 274 |
| 15% | 412 | 448 | 385 |
| 20% | 496 | 542 | 478 |
| 25% | 592 | 647 | 583 |
| Pot Life, Min. (100° C.) | 7½ | 8 | 7½ |

When tested in identical tests, 90 Shore A Hardness resins (Example 1) gave the following properties:

| | | | | | |
| --- | --- | --- | --- | --- | --- |
| Poly(tetramethylene) glycol, eq. % | 100 | 90 | 80 | 70 | 60 |
| Poly(oxypropylene) glycol, eq. % | 0 | 10 | 20 | 30 | 40 |
| NCO/OH | 1.924 | 1.928 | 1.931 | 1.934 | 1.936 |
| Theo.% NCO-Undistilled | 6.00 | 6.00 | 6.00 | 6.00 | 6.00 |
| Actual % NCO-Undistilled | 5.99 | 6.07 | 6.15 | 6.19 | 6.13 |
| % Free | 2.75 | 2.45 | 2.56 | 2.93 | 2.22 |
| % NCO - Distilled | 4.97 | 5.00 | 4.96 | 4.99 | 4.97 |
| % Free TDI-Distilled | 0.20 | 0.34 | 0.22 | 0.17 | 0.17 |
| Physical Properties - MOCA Cured - 90% Stoichiometry - Press Cured 30 min./212° F. - Post Cured 16 hrs. 212° F. | | | | | |
| Tensile | 6750 | 4850 | 4260 | 5440 | 5080 |
| % Elongation | 410 | 430 | 390 | 450 | 460 |
| Hardness - A/D | 94/41 | 94/40 | 93.40 | 93.39 | 93.38 |
| Tensile Modulus | | | | | |
| at 100% Elong. | 1610 | 1480 | 1450 | 1370 | 1340 |
| at 200% Elong. | 2150 | 1930 | 1880 | 1880 | 1770 |
| at 300% Elong. | 3180 | 2720 | 2640 | 2530 | 2400 |
| at 400% Elong. | 6370 | 4740 | — | 4220 | 4100 |
| Tear - Die C | 477 | 473 | 456 | 433 | 409 |
| Bashore Rebound $ | 47 | 45 | 42 | 43 | 39 |
| Compression Set % | 26.0 | 29.2 | 30.5 | 34.6 | 34.6 |
| Compression Modulus | | | | | |
| at 5% Deflection | 386 | 352 | 324 | 355 | 322 |
| at 10% Deflection | 727 | 665 | 618 | 671 | 600 |
| at 15% Deflection | 948 | 866 | 795 | 868 | 765 |
| at 20% Deflection | 1154 | 1050 | 963 | 1043 | 920 |
| at 25% Deflection | 1375 | 1251 | 1145 | 1238 | 1097 |
| Gel-Time min at 212° F. | 9 | 7½ | 11½ | 8½ | 8½ |
| *Evaluation of 2" × 6" Tire Plugs | | | | | |
| Rolling resist. amps (5 min.) | 4.0 | 3.5 | 3.5 | 4.0 | 4.0 |
| Time to destruction, min. | 150 | 100 | 120 | 23 | 25 |
| | 120 | 100 | 95 | 23 | 25 |

*Industrial Research, August 1977, Prediction of Performance of Polyurethanes

EXAMPLE 5

Comparison tests are performed on commercially available poly(tetramethylene) glycol based casting resins.

| | Du Pont Adiprene "L" Series | | | | |
| --- | --- | --- | --- | --- | --- |
| | L-83 | L-100 | L-167 | L-200 | L-315 |
| % Free NCO | 3.2 | 4.2 | 6.3 | 7.5 | 9.45 |
| MOCA (95% theory based on 100 g prep) | 9.6 | 12.6 | 19.0 | 22.6 | 28.5 |
| Pot life at mix temp* | 7.5 | 15 | 6 | 5 | 1 |
| Hardness: Shore A | 83 | 90 | 95 | — | — |
| Shore D | — | 43 | 50 | 58 | 75 |
| Tensile, psi | 4400 | 4500 | 5000 | 7800 | 11000 |
| 100% Modulus, psi | 700 | 1100 | 1800 | 300 | 4300 |
| 300% Modulus, psi | 1200 | 2100 | 3400 | 8300 | — |
| Elongation, % | 550 | 450 | 400 | 315 | 270 |
| Tear Strength, Die C,pli | 400 | 500 | 600 | — | 725 |
| Split, pli | 75 | 75 | 150 | 135 | 116 |

-continued

| Du Pont Adiprene "L" Series | | | | | |
|---|---|---|---|---|---|
| | L-83 | L-100 | L-167 | L-200 | L-315 |
| Resilience, Bashore, % | 50 | 45 | 40 | 40 | 48 |
| Compression Set, Method "B", % | 35 | 27 | 45 | — | — |

*100° C.
Composition:
L-83 - not known
L-100 - 1.67/1.0, NCO/OH ratio, 80/20 TDI/PTMEG**1000
L-167 - 2.0/1.0, NCO/OH ratio, 80/20 TDI/PTMEG 1000
L-200 - 55%/45% blend L-167/L-315
L-315 - 2.0/1.0, NCO/OH ratio, 80/20 TDI/PTMEG 1000, 1,3 butanediol (.55/.45 eq.) blend

**PTMEG = poly(tetramethylene) glycol
HO—(CH₂CH₂CH₂CH₂—O)ₓCHCH₂CH₂CH₂—OH

| | Uniroyal Vibrathane Casting Resins MOCA Cured | | | | |
|---|---|---|---|---|---|
| | B-600 | B-601 | B-602 | B-614 | B-615 |
| % NCO | 4.15 | 6.20 | 3.05 | 7.5 | 5.1 |
| Stoichiometry % | 90 | 90 | 90 | 95 | 95 |
| Pot life, min/temp. °F. | 1-/212 | 55/160 | 10/212 | 3/160 | 8/180 |
| Hardness- | | | | | |
| Shore A | 90 | 95 | 84 | | 91 |
| Shore D | 42 | 48 | 32 | 60 | 630 |
| Tensile, psi | 5500 | 6500 | 5500 | 7250 | 6700 |
| 100% Modulus, psi | 1100 | 2100 | 800 | 3030 | 1500 |
| 300% Modulus, psi | 2200 | 4300 | 1470 | 6120 | 3300 |
| Elongation, % | 430 | 380 | 490 | 330 | 410 |
| Tear Strength, pli ASTM D-470 | 70 | 120 | 40 | 120 | 630 (Die C) |
| Bashore Resilience, % | 42 | 40 | 58 | 45 | 43 |
| Compression set Method B 22 hrs. 158° F. | 25 | 30 | 20 | 30.5 | 30 |

EXAMPLE 6

Industrial tires are molded by standard techniques and tested on a tire tester as described in Industrial Research, August 1977, in an article entitled "Prediction of Performance of Polyurethane Prepolymers". The results of testing 3 samples from prepolymers prepared as in Example 1 and 3, samples prepared from a commercial tire prepolymer Uniroyal Vibrathane B-615 (a urethane casting resin with standard free TDI content based on 100% poly(tetramethylene) glycol. The results are shown.

| | Evaluation of Urethane Industrial Tires (2) - 10 × 5 × 6½ in. | | | | | |
|---|---|---|---|---|---|---|
| Sample | XP9897 ZL952 S2090A | XP9897 XL952 S2090A | XP9897 XL952 S2090A | Vibrathane B-615 | Vibrathane B-615 | Vibrathane B-615 |
| % Stoichiometry | 85 | 90 | 95 | 85 | 90 | 95 |
| Shore A Hardness | 90 | 90 | 90 | 90 | 90 | 90 |
| Dyanamic Deflection (Inches at Stated Loads at 2 mph) | | | | | | |
| 500 lbs. | .028 | .034 | .037 | .033 | .038 | .047 |
| 1000 lbs. | .067 | .068 | .072 | .063 | .067 | .077 |
| 1500 lbs. | .096 | .095 | .096 | .089 | .099 | .103 |
| Rolling Resistance (amps. at 100° C.) | | | | | | |
| 2 mph  500 lbs. | 3.5 | 3 | 3.3 | 3.5 | 3.5 | 4 |
| 2 mph  1000 lbs. | 4 | 3.7 | 3.7 | 4 | 4.5 | 4.7 |
| 2 mph  1500 lbs. | 5 | 4.7 | 4.5 | 5 | 5.3 | 5 |
| 2 mph  2000 lbs. | 5.5 | 5.3 | 5.5 | 5.7 | 6.5 | 6.7 |
| 4 mph  500 lbs. | 3.5 | 3.5 | 3.3 | 4 | 4.7 | 4.3 |
| 4 mph  1000 lbs. | 4 | 4.3 | 4.3 | 4.5 | 5 | 5 |
| 4 mph  1500 lbs. | 5 | 5 | 4.7 | 5.5 | 5.7 | 6 |
| 4 mph  2000 lbs. | 5.5 | 6 | 5.5 | 6.7 | 6.7 | 7 |
| 6 mph  500 lbs. | 4 | 4.3 | 4 | 4.3 | 4.5 | 4.5 |
| 6 mph  1000 lbs. | 4.5 | 5 | 4.5 | 5.7 | 5 | 5.5 |
| 6 mph  1500 lbs. | 5.3 | 5.7 | 5.3 | 5 | 6 | 6 |
| 6 mph  2000 lbs. | 6.3 | 6.5 | 6 | 6.5 | 6.75 | 7 |
| Dynamic Destructive Test | | | | | | |
| Rolling Resistance | | | | | | |
| after 15 min. | 6.7 | 6 | 5.7 | 6 | 6.7 | 6.5 |
| after 30 min. | 5.5 | 5.5 | 5.3 | 5.5 | 6 | 6 |
| Blow-Out time[1](min) | 662 | 615 | 660 | 428 | 335 | 235[3] |

[1]Test cycle: 8 hours/5 mph/2000 lbs.
2½ hours/5 mph/2500 lbs.
ti destruction/6 mph/2500 lbs.
[2]Values listed are average of two tires tested.
[3]Value represents one test result. Second test blew out at 80 minutes and was discarded.

The subject matter which applicant regards as his invention is particularly pointed out and distinctly claimed as follows:

1. A curable composition comprising:
   (a) a polyether polyol endcapped with toluene diisocyanate and having a free toluene diisocyanate content of less than 0.45%; and
   (b) 4,4'-methylene-bis-(2-chloraniline).

2. A curable composition as defined in claim 1 wherein the polyether polyol is based on poly(tetramethylene) glycol.

3. A curable composition as defined in claim 1 wherein the polyether polyol is based on an 80%/20% by weight mixture of poly(tetramethylene) glycol and poly(oxypropylene) glycol.

4. A curable composition as defined in claims 1, 2 or 3 wherein the toluene diisocyanate is an 80/20 ratio of the 2, 4 to 2, 6 isomers.

5. A curable composition as defined in claim 3 wherein the polyether polyol has an effective 500 equivalent weight.

6. A curable composition as defined in claim 4 wherein the polyether polyol has an effective equivalent weight of 500.

7. A process for the preparation of a cast object which comprises:
(a) treating a polyether polyol with an excess of a stoichiometric amount of toluene diisocyanate to prepare a toluene diisocyanate endcapped prepolymer having an unreacted excess of toluene diisocyanate admixed therein;
(b) removing the excess unreacted toluene diisocyanate from the mixture of step a) produce a toluene diisocyanate endcapped prepolymer substantially free of toluene diisocyanate;
(c) mixing the product of step b) with a curing amount of 4,4'-methylene-bis-(2-chloroaniline);
(d) placing the mixture of step c) in a mold of the desired shape; and
(e) treating the mold containing the mixture of step c) as prepared in step d) at a curing temperature.

8. A cured solid rubbery object comprising the reaction products of:
(a) a toluene diisocyanate endcapped polyether polyol having an unreacted toluene diisocyanate content of less than 0.45%; and
(b) 4,4'-methylene-bis-(2-chloroaniline).

* * * * *

UNITED STATES PATENT OFFICE
CERTIFICATE OF CORRECTION

Patent No. 4,182,825          Dated January 8, 1980

Inventor(s)  William A. Jackle

It is certified that error appears in the above-identified patent and that said Letters Patent are hereby corrected as shown below:

Column 2, line 12, delete "priod" and insert therefor -- period --.

Column 4, line 25, after "Free" insert -- TDI-Undistilled --.

Column 4, line 37, delete "$" and insert therefor -- % --.

Columns 5 and 6, line 42, last line of foot note (1), delete "ti" and insert therefor -- until --.

Signed and Sealed this

Third Day of February 1981

[SEAL]

Attest:

RENE D. TEGTMEYER

Attesting Officer    Acting Commissioner of Patents and Trademarks